Nov. 11, 1924. Re. 15,945

B. SELBY

MEANS FOR APPLYING PASTE OR THE LIKE TO PAPER

Original Filed Feb. 10, 1919

INVENTOR.
BERT SELBY.

BY

ATTORNEYS.

Reissued Nov. 11, 1924. Re. 15,945

UNITED STATES PATENT OFFICE.

BERT SELBY, OF INDIANAPOLIS, INDIANA.

MEANS FOR APPLYING PASTE OR THE LIKE TO PAPER.

Original No. 1,337,799, dated April 20, 1920, Serial No. 276,230, filed February 10, 1919. Application for reissue filed March 4, 1922. Serial No. 541,174.

*To all whom it may concern:*

Be it known that I, BERT SELBY, a citizen of the United States, residing at Indianapolis, in the county of Marion and State of Indiana, have invented a new and useful Means for Applying Paste or the like to Paper; and I do hereby declare that the following is a full, clear, and exact description thereof, reference being had to the accompanying drawings, in which like numerals refer to like parts.

This invention relates to a mechanism for applying paste or a like substance to paper, and in this case more specifically to wall paper.

The main object of the invention is to provide a mechanical means for quickly and rapidly applying the paste to wall paper as it is used, in place of the old method in common practice of applying the paste with a brush.

The device for attaining this object comprises a paste containing receptacle with means for heating it and keeping it at the proper temperature so as to do away with the operator wasting time by heating each individual bucket of paste, in combination with which is a device for applying the paste by simply pulling the paper therethrough, and also means for cutting the paper longitudinally as it is pulled through the paste applying device.

This invention which comprises a very compact and simple mechanism, saves much time and energy, which is lost ordinarily in the use of the common practice of applying the paste with a brush, heating the paste and cutting the paper, independently of each other.

Figure 1:
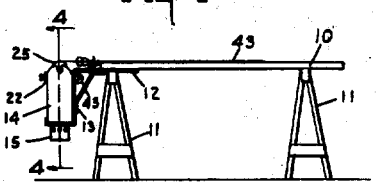
Figure 2:
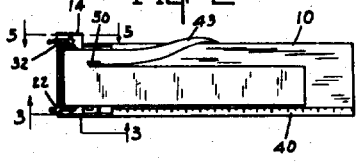
Figure 4:
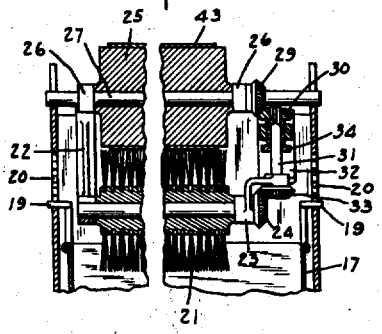
Figure 3:
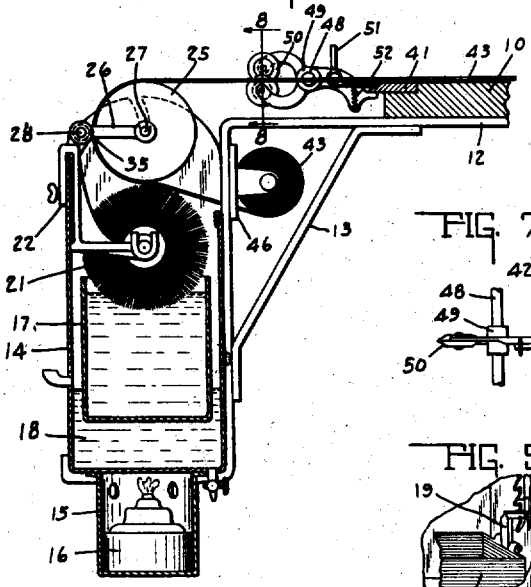
Figure 5:
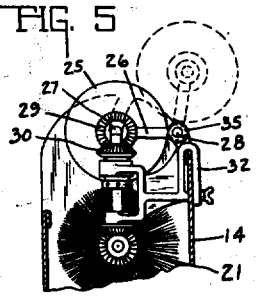
Figure 7:
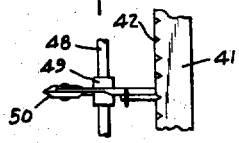
Figure 6:
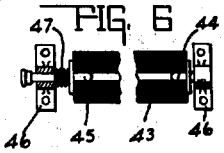
Figure 9:
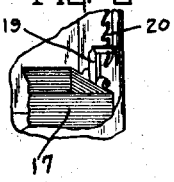
Figure 8:
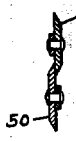
Figure 10:
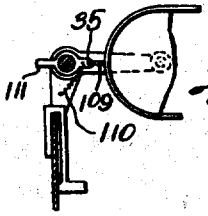

In the drawings, which are made a part of this application, Figure 1 shows a side elevation of the pasting table with the paste applying mechanism at one end thereof. Fig. 2 is the same as Fig. 1 showing a plan view with a strip of wall paper being cut longitudinally by said mechanism. Fig. 3 is an enlarged view of a cross section taken on the line 3—3 of Fig. 2. Fig. 4 is an enlarged view of a cross section taken on the line 4—4 of Fig. 1. Fig. 5 is an enlarged view of the upper portion of a cross section taken on the line 5—5 of Fig. 2. Fig. 6 is a section through the mechanism for securing the paper roll. Fig. 7 is a plan view appearing from under the cutting mechanism. Fig. 8 is a cross section taken on the line 8—8 of Fig. 3. Fig. 9 is a perspective view of one corner of said device showing the means for supporting the paste pan therein. Fig. 10 is an enlarged sectional view of the paste spreading mechanism and the mounting therefor.

In the drawings there is shown a table 10 upon which wall paper is pasted, cut and folded, and horses 11 for supporting the same. Secured at one end of said table there is a bracket 12 braced by a brace 13, in which is secured a sheet metal housing member 14. Extending downwardly from the lower portion of the bracket 12 there is a bracket 15 for supporting a lamp or burner 16 directly under said housing member for heating the contents thereof. Removably and adjustably contained in said housing member, there is a paste container 17 which is adapted to set within water as shown at 18 which is kept heated by the lamp 16, so as to keep the paste heated during the operation of the applying mechanism. The paste container 17 is adjustably and removably secured within said housing member by the arms 19 pivoted thereon and having a projection extending outwardly therefrom adapted to pass through the slot 20 in the side of the housing and drop into and be supported within the downwardly extending recesses thereof. This construction is such that when it is desired to remove the container from the housing the supporting members may be turned inwardly and out of engagement with the slot 20. This adjustable hanger for the paste container 17 is such that the container may be elevated or lowered according to the depth of paste therein, whereby the paste brush may extend completely to the bottom thereof, cleaning out all the paste contained therein.

Adjustably secured within the housing 14 there is a paste applying roller brush 21 which is supported at one end by the adjustable bracket and bearing 22 and at the other end by the bearing 23 at which end there is a beveled gear 24 secured to the shaft thereof. Supported parallel and adjacent to the roller brush 21 there is a cylindrical wood roller 25 which is supported in position by the arm 26 on each end thereof having bearings on one end through which the shaft 27 extends, and pivoted at their other end to the end portion of said housing, whereby the roller 25 may be lifted upwardly about the pivot point 28 to the position shown in dotted lines in Fig. 5 for enabling the contents of the housing to be removed therefrom or the paper to be threaded between said rollers. Secured to one end of the shaft 27 there is a beveled gear 29 adapted to mesh with the beveled gear 30 which is secured to a shaft 31 supported by the bracket 32, said shaft 31 being rigidly secured to the beveled gear 33 in position to mesh with and drive the gear 24 and roller brush 21.

As it is desirable for the rollers 21 and 25 to be adjustable with relation to each other, I have provided the adjustable support 22 for one end of the roller 21 and an adjustable means on the driving mechanism at the other end of said roller. This is accomplished by keying the gear 30 on the shaft 31 so as to be slidable longitudinally thereon and an adjustable collar 34 for adjusting the gear 30. By means of this construction the rollers are adjustable with relation to each other while the beveled gears driven by the same shaft will remain in mesh with the beveled gears of such roller. Pivotally mounted at 28, there is a paste spreading member 35 extending to approximately the surface of the roller 25 and having a rubber edge 109 extending the entire length of said roller for engaging the surface thereof and removing any surplus of paste. Said paste remover has a spring 110 for holding it in contact with said roll and a thumb piece 111 for removing it therefrom when the paper is threaded through the device.

The table 10 may be provided along one edge thereof with a ruler 40 by means of which the paper may be measured as it is pulled through the machine. Embedded in the end of the table, there is a metal plate 41 ruled cross-wise of said table. On the under edge of said plate 41 and at measured distances there are a plurality of notches or indentations 42. The paper to be pasted is contained in a roll 43 which is removably supported upon the pins 44 and 45 secured in the bracket 46 on the side of the housing member 14. The pin 45 is adjustably fitted in the bracket and held against the paper roll under the tension of the spring 47, whereby rolls of various lengths may be supported on said pin and held in one given position relative to the mechanism, and be readily removed and replaced thereon. A cross bar 48 is secured to the end of the table so as to support a sliding sleeve 49 which is integral with a pair of roller scissors 50 for cutting the paper longitudinally as it is pulled past or between said scissors. Integral with the bearing 49 there is a tail piece 51 adapted to engage the notches 42 according to the width of the paper to be cut, and is held in said notches by a spring 52 until moved by hand to some other cutting width.

The invention claimed is:

1. A paste applying mechanism, including a paste containing receptacle, a rotary member mounted in said receptacle adapted to engage said paste for applying it to the material as it is drawn through said mechanism, a roller about which said material is drawn adapted to cause it to be engaged by said member, and a set of gears adjustably mounted for connecting said member to said roller, whereby said member is caused to rotate therewith.

2. A paste applying mechanism, including a housing, a paste containing receptacle supported in said housing, a rotary member mounted in said housing adapted to engage said paste for applying it to the material as it is drawn through said mechanism, a roller about which said material is drawn, adapted to cause it to be engaged by said rotary member, and a set of gears connecting said member to said roller, whereby said member is caused to rotate therewith.

3. A paste applying mechanism, including a housing member, a paste containing receptacle supported in said housing member, a rotary member mounted in said housing member, adapted to engage said paste for applying it to the material as it is drawn through said mechanism, a roller about which said material is drawn adapted to cause it to be engaged by said member, means for engaging the material as it passes over said roller for removing surplus paste therefrom, a set of gears connecting said rotating member and said roller, and means for adjusting said gears relative to each other as the roller and member are adjusted.

4. A paste applying mechanism, including a housing member, a paste containing receptacle supported within said member, a paste applying rotary member adapted to engage said paste for applying it to the material as it is drawn through said mechanism, a cylinder supported so as to engage said member about which said material is drawn, and means for permitting said cylinder to be elevated out of said housing member, so that the contents thereof may be removable or the paper threaded about said cylinder.

5. A paste applying mechanism, including a housing, a paste containing receptacle in said housing, a rotary paste applying member adapted to have its periphery immersed in paste, a paper carrying roller mounted adjacent said member for causing the paper to be engaged by said member and receive a coating of paste thereover, and means for adjusting said roller and receptacle within said housing.

6. In a pasting machine the combination with a paste receptacle, a paste applying roller detachably and adjustably positioned in said receptacle and substantially closing the same, and paste applying mechanism associated with said paste applying roller and above the same, of means tiltably supporting said paste applying mechanism in the paste applying position, said paste applying mechanism being tiltable into a non-pasting position to permit access to said receptacle after the roller has been detached therefrom.

7. In a paste applying machine, the combination with a housing, a detachable paste receptacle supported thereby, a paste applying roller detachably positioned in said receptacle and substantially closing the same, and paste applying mechanism associated with said paste applying roller and above the same, of means tiltably supporting said paste applying mechanism in the paste applying position, said paste applying mechanism being tiltable to the non-pasting position to permit access to said roller and to said receptacle, said roller being removable from said receptacle to permit access thereto, and said receptacle being removable from said housing.

In witness whereof, I have hereunto set my hand at the city of Indianapolis, county of Marion, and State of Indiana, this twentieth day of February, 1922.

BERT SELBY.